Patented Apr. 16, 1929.

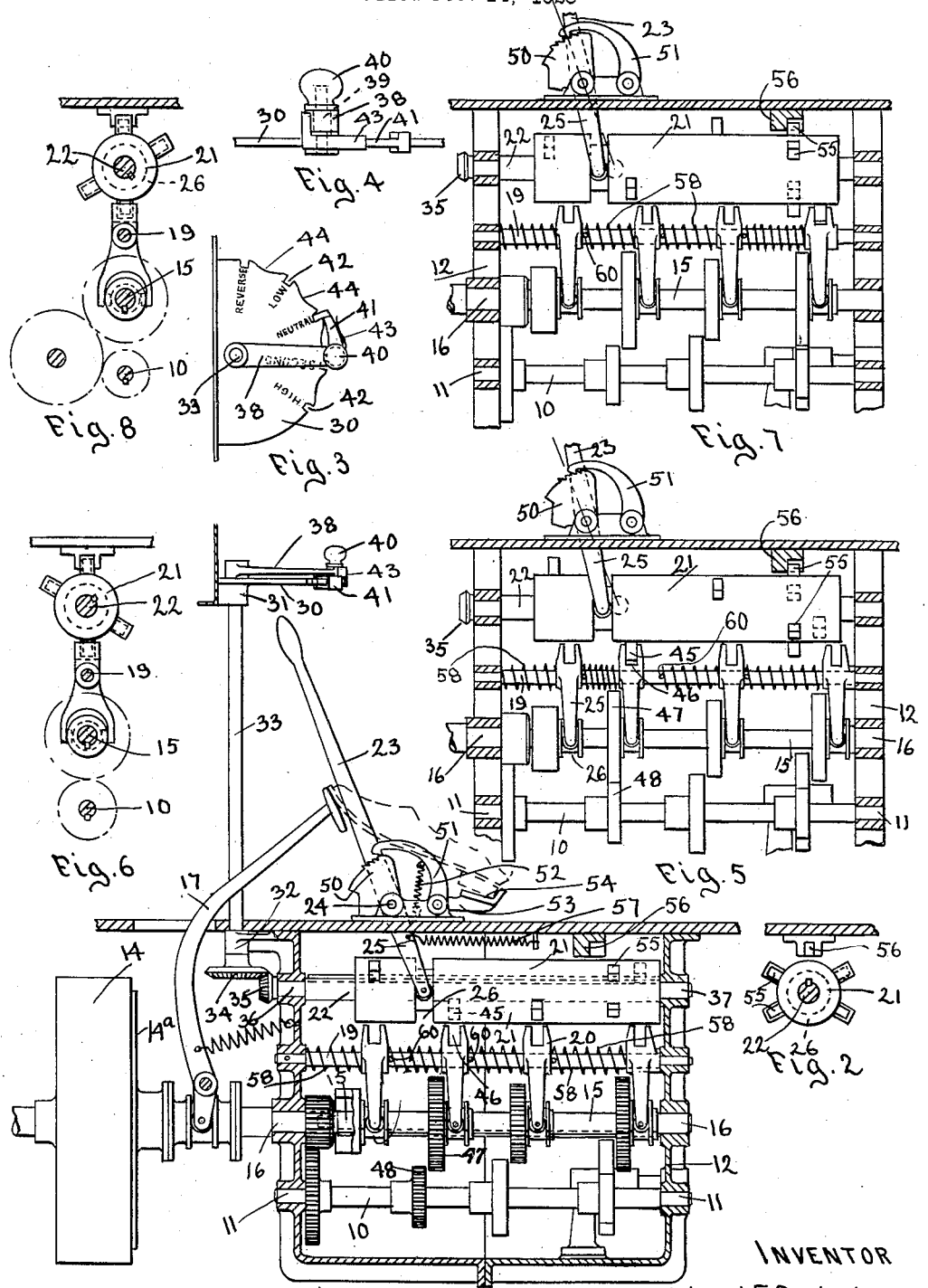

1,709,148

UNITED STATES PATENT OFFICE.

EDWARD F. PENDEXTER, OF MILFORD, MASSACHUSETTS.

GEAR SELECTING AND CHANGING DEVICE.

Application filed December 14, 1928. Serial No. 325,969.

My invention relates to improvements in gear changing devices such as are used with automotive vehicles.

One object of my invention is to provide a device in which, selective elements manually operated by the operator, and operating in conjunction with a shift lever, will positively insure the required combination of gearing to obtain the particular result desired.

A second object is to provide mechanism through which, the gear shift lever will shift the gearing to attain the indicated result, when swung in one direction from the neutral position. It is well known that in an emergency, a nervous or inexperienced operator will often operate the usual speed changing devices in a manner to endanger life and limb, either by stalling the engine by improper movement of the shift lever, or for the same reason shifting unintentionally to the wrong speed required for the case. With my invention however, when the indicator is moved to a particular indication, the required change of gears is positive, when the shift lever is operated. Other objects and novelties will appear in the accompanying specifications and claims and the drawings forming a part thereof, in which I have described and illustrated a preferred form of my invention. I do not confine myself however to the exact form and construction shown, as I may modify both the construction and operation of my device without departing from the scope of my claims.

In the drawings:—

Fig. 1 is a sectional elevation illustrating my device relative to the operative mechanism of an automobile.

Fig. 2 is an end view of the selector drum from the end next the right hand journal, Fig. 1.

Fig. 3 is a plan view of the indicator and dial.

Fig. 4 is a front view of the same.

Fig. 5 shows diagrammatically the essential elements of my device in first speed position.

Fig. 6 is an end view of same showing the position of selector drum when rotated to the required position.

Fig. 7 shows a similar view to Fig. 5 with parts in position to reverse.

Fig. 8 is a similar view to Fig. 6 as related to Fig. 7.

In the drawings the usual gear shaft 10 is rotatable in the bearings 11 of the gear casing 12. 14 shows the usual balance wheel and 14ª the clutch rotatable with and slidable on the driving shaft 15 journaled at 16 in the gear casing.

The clutch is operated in the usual manner by the clutch lever 17. Within the gear casing is shown a three speed and reverse transmission of the usual type, and it will be obvious that my invention may be readily modified to use with a four speed transmission or similar variation. In my device I prefer for convenience to arrange the order of my change gearing in different relative positions without however change in the action or the results obtained as I will now explain.

The several change gears are rigidly mounted on the shaft 10 and the shafts 10 and 15 are geared together as usual, the change gears being in suitable relation to corresponding sliding gears on the driving shaft, the operation and functions of the several pairs of gears being the same as in the usual transmission, but varied in relative position for the reasons to be explained.

The several slide gears for the different combinations are slidable axially on the shaft 15 and are operated by means of independent shifting forks slidable on the guide rod 19, rigid with the casing 12, and parallel with the shaft 15. Each shifting fork is provided with a forked extension 20 which is adapted to be engaged by suitably disposed studs projecting from the periphery of the drum 21, which is hereinafter termed the selector. This selector is rotatable with and slidable axially on the shaft 22, the selector being slidably operated by means of the shift lever 23, swiveled at 24 and forked at 25 to engage the groove 26 formed in the selector. As one of the objects of my invention is to enable me to make all gear changes by movement of the shift lever in one direction from neutral position, instead of the common practice of alternate movements in opposite directions, I have arranged my sliding gears on the shaft 15 in such relation to the change gears on shaft 10, that when a particular speed change is indicated by means hereinafter described, the required gear change is positively made by swinging the lever in a fixed arc in one direction, regardless of the change indicated. The sliding gears are positioned relative to corresponding change gears such that whatever speed is indicated, the combination is made when the shift lever is swung from neutral, the number of combinations being expansible within reasonable limits. When the indicator which I will presently describe, is set for a particular speed, the action of shifting the sliding gears is limited to the particular gear in the combination for that speed. The description of the indicator and its operation will now be given. Mounted in a suitable position preferably on the instrument board is a dial 30.

This dial is preferably in the form of a segment of a circle, the periphery being notched for reasons to be explained.

Journaled at 31 in this dial and at 32 in an extension from the casing 12, is the shaft 33, a bevel gear 34 rigid therewith meshing with a corresponding bevel gear 35 rigid with the shaft 22 with bearings at 36 and 37 in the casing 12. To the upper end of the shaft is secured a lever 38 in the outer end of which is journaled a trunnion 39 on the upper end of which is secured a handle 40, and on the other end of which is secured the pawl 41, adapted to engage with notches 42 corresponding to the several speeds to be required and indicated, together with a notch for neutral. A spring 43 yieldingly presses the pawl against the periphery of the dial, and the several notches may be designated if desired. The particular arrangement of these slots is arbitrary, but as will be shown must be in accord with other elements of the shifting device. Between the several slots are depressions in the periphery of the dial as at 44. As the pawl is released from a notch by a slight rotation of the handle and the lever is pressed toward another setting, the pawl will engage the periphery and will be guided by the depressions toward the axis of the lever and as the pawl approaches the next slot it together with the handle is rotated away from the axis, furnishing a warning to the operator that the pawl is approaching the next slot, and the movement of the handle may be slowed to readily drop into the next slot and thus avoid bruising the edge thereof or running over.

As the indicator is thus rotated, the selector is correspondingly rotated, according to the ratio of the bevel gears.

The studs hereinbefore mentioned as projecting from the selector 21 are so disposed angularly and laterally on the periphery of the selector, that when the indicator is moved to a station indicating a particular speed, the selector is rotated as described to align the stud with the particular forked extension adapted to shift the sliding gear to produce that result. With the shift lever at neutral position, the indicator may be moved to the required speed indication. If it be to first speed the selector is rotated and as the pawl 41 engages the slot in the dial, the stud 45 is aligned with the fork 46 which is adapted to engage the sliding gear 47.

When the shifting lever 23 is swung, the selector is moved axially on its shaft, and the stud 45 operates in connection with the fork 46 to engage the sliding gear 47, with the change gear 48, the combination of gears being such that low speed is transmitted to the tail shaft when the clutch 14$^a$ is engaged.

Should any other speed be required, the same procedure is followed, as shown in Figs. 5 and 7 where the setting is shown respectively for low speed and reverse. When the shift lever is swung from neutral to complete a speed combination, it is locked in position by suitable means and I have shown a preferred form in which the ratchet 50 rigid with the lever 23, is engaged by the pawl 51, normally held in yielding engagement with the ratchet element by a spring 52. This pawl is formed integral with a lever 53 in which is formed a socket in which the heel may rest as at 54. In order that there may be no possibility of change in the completed combination by movement of the indicator and consequent disengagement of the particular stud with its shifting fork, I provide means for locking which I will now describe.

The selector 21 is provided with a plurality of studs 55, projecting from the periphery thereof, each corresponding with a particular stud adapted to engage a shifting fork, and related in position thereto. Rigidly mounted relative to the selector is a forked abutment 56 with which each stud is adapted to engage when the shift lever is swung and locked to engage any speed changing combination. This prevents any rotation of the selector or indicator while any combination of gears are in mesh. When a change of speed is to be made, the shifting lever is released simultaneously with the release of the clutch by means of the heel of the operator engaging the socket 54 integral with the pawl 51. By means of the spring 57 the lever 23 is swung to neutral as the pawl is released from the ratchet tooth, and the selector is returned to a position in which a new setting may be made. To prevent the movement of the sliding gears on the shaft 15 when the shaft is being rotated by one combination, I provide the springs 58 each operating on a particular shifting fork to yieldingly retain it in its neutral position against an abutment 60 projecting from the guide rod 19.

Having thus described my invention, I claim:—

1. In a gear transmission including as elements a plurality of change gears, corresponding sliding gears, a rotatable, slidable selector element having studs projecting from the periphery thereof for the purpose of engaging gear shifting members, means for rotating the selector member to an indicated position, and a shift lever for reciprocating the selector member for the purpose of engaging sliding gears with corresponding change gears; in combination therewith individual shifting members engaging each sliding gear and adapted to be engaged by a particular peripheral stud when the selector member is rotated to an indicated position for the purpose of meshing the particular sliding gear with a corresponding change gear when the shift lever is operated; and automatic means for securing the shift lever when so operated; for the purpose of retaining the elements in operative relation.

2. In a gear transmission including as elements a plurality of change gears, corresponding sliding gears, a rotatable, slidable selector element having studs projecting from the periphery thereof for the purpose of engaging gear shifting members, means for rotating the selector member to an indicated position, and a shift lever for reciprocating the selector member for the purpose of engaging the sliding gears with corresponding change gears; in combination therewith, individual shifting members engaging each sliding gear and adapted to be engaged by a particular peripheral stud when the selector member is rotated to an indicated position for the purpose of meshing the particular sliding gear with a corresponding change gear when the shift lever is operated in one direction through a predetermined arc; and automatic means for securing the shift lever in such operated position, for the purpose of retaining the elements in operative relation; and means for automatically returning the particular sliding gear to neutral position when the retaining means are released.

3. In a selecting and gear changing device of the character described in claim 1, the combination therewith of means automatically functioning when the shift lever is operated, for preventing the rotation of the selector in any position other than neutral relative to the shift lever.

4. In a selecting and gear changing device of the character described in claim 1, the combination therewith of projections from the selector member, each in like relation to corresponding peripheral studs; an abutment, fixed relative to the selector member and formed to engage any of said projections when selector member is rotated to operate on a corresponding sliding gear and operated by the shift lever; for the purpose of limiting the sliding movement, and preventing the rotation of the selector member when in operative position to complete a required change of speed change gears.

5. In a selecting and gear changing device of the character described in claim 1, and including an indicator operatively connected to rotate the selector member through predetermined arcs, a dial notched in accordance with such arcs, and a pawl swiveled to the indicator and adapted to engage the notches in the dial; in combination therewith a handle rigid with the pawl, and cam surfaces between contiguous notches against which the pawl is yieldingly pressed when the indicator is moved to indicate a required change of speed, for the purpose of indicating the approach of the pawl end to a notch, by a rotative movement of the handle and pawl about a common swivel axis.

6. In a selecting and gear changing device of the character described in claim 1, and having a swiveled shift lever adapted to reciprocate the selector member, in combination therewith a toothed segment rigid with the shift lever and concentric with the axis thereof; a pawl independently swiveled and adapted to yieldingly bear on the segment and to engage a tooth thereof when the lever is swung; an extension from the pawl formed with a socket in which the heel of the operator may bear for the purpose of simultaneously releasing the shift lever and the clutch connecting the transmision shaft with the prime mover; and yielding means operating on the shift lever to swing it to neutral position when released from the pawl.

EDWARD F. PENDEXTER.